No. 805,023. PATENTED NOV. 21, 1905.
J. McBOYLE.
GARDEN HOSE SUPPORT.
APPLICATION FILED OCT. 17, 1904.
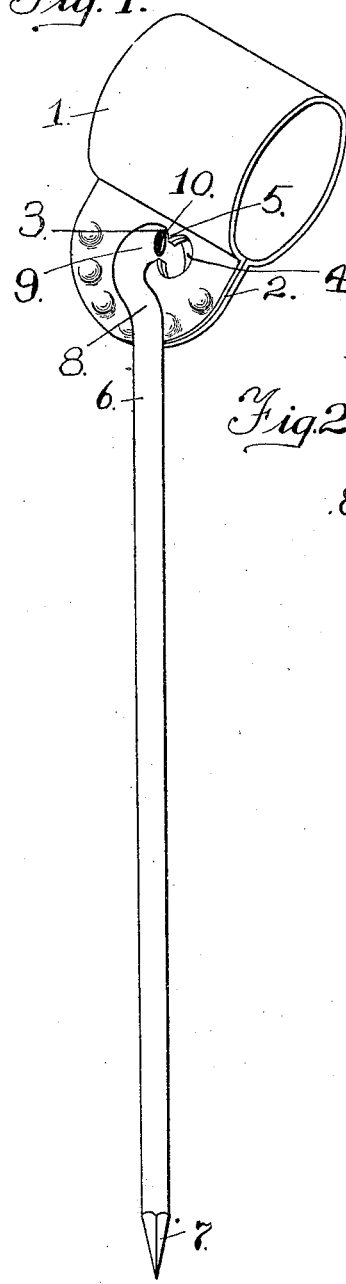
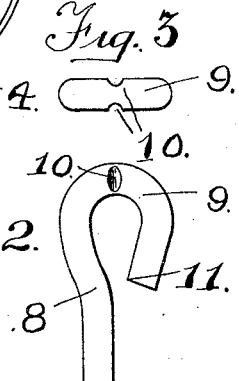
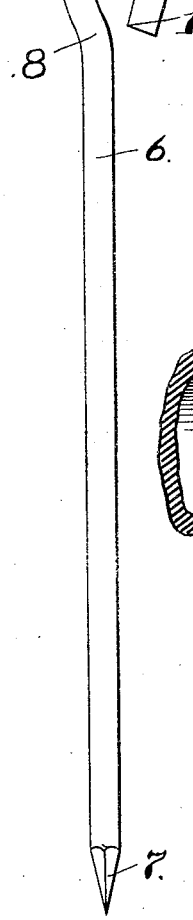
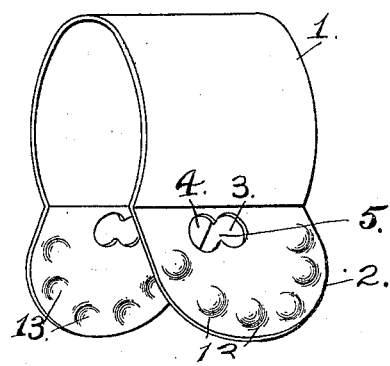
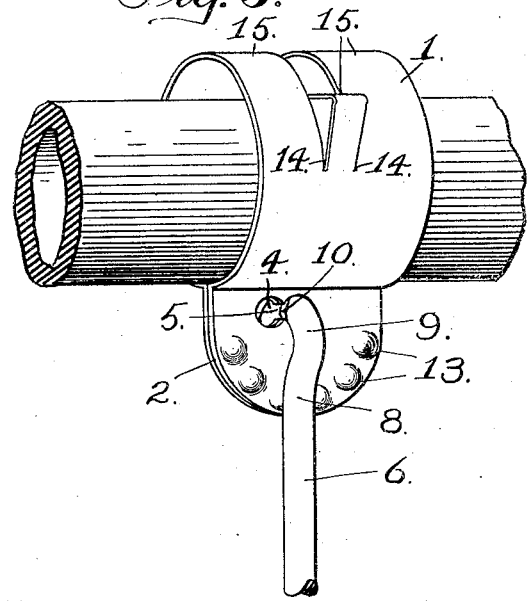
Witnesses
Inventor
J. McBoyle
By F. W. Wright
Attorney

UNITED STATES PATENT OFFICE.

JOSEPH McBOYLE, OF OAKLAND, CALIFORNIA.

GARDEN-HOSE SUPPORT.

No. 805,023.  Specification of Letters Patent.  Patented Nov. 21, 1905.

Application filed October 17, 1904. Serial No. 228,893.

*To all whom it may concern:*

Be it known that I, JOSEPH MCBOYLE, a citizen of the United States, residing at Oakland, in the county of Alameda and State of California, have invented certain new and useful Improvements in Garden-Hose Supports, of which the following is a specification.

This invention relates to an improved garden-hose support, the object of the invention being to provide a device for supporting upon the ground a garden hose-pipe in position to discharge a spray or stream of water over an extensive area or which may be used as a handle with which to direct the hose-pipe by the hand, which support shall be simple and cheap in construction, containing few parts, easily assembled, easily adjusted for different angles of inclination, and self-locking when moved from one position of adjustment to another.

In the accompanying drawings, Figure 1 is a perspective view of the device. Fig. 2 is a side view of the stem detached. Fig. 3 is a plan view of the same. Fig. 4 is a perspective view of the band detached. Fig. 5 is a perspective view showing the support in use for a hose of small diameter.

Referring to the drawings, 1 represents a band of spring sheet metal adapted to surround a garden-hose, the ends of said band being bent into ears or flaps 2 substantially semicircular in form and substantially parallel with each other. Said ears have mediate apertures 3 registering with each other when the ears are pressed together, said apertures being extended on one side, as shown at 4, in a direction parallel with the lines of bending of the ears, but the metal between the apertures and the extensions extending slightly inward on each side, as shown at 5, to form a contracted throat between said apertures and extensions thereof.

6 is the stem for supporting the band, said stem being pointed at its lower end 7 and adapted to be pressed into the ground in a vertical or slightly-inclined position, as may be desired. The upper end of said stem is bent at 8 into a hook 9, the top of the hook being formed with notches 10, one on each side. It is by means of these notches that these two parts are enabled to be assembled, the method of the assembling being as follows: First, the two ears of the band are pressed firmly together, and while they are in this position the lower edge of said ears which are nearest to the extensions 4 are passed inside the hook—that is, between the point 11 of the hook and the bend 8 thereof from the stem—until the point of the hook comes opposite to the extended aperture 4 of the ear on that side over which it has been passed. Then said point is passed through both of said extended apertures 4 and is given a half-turn until the notched portion of the hook comes opposite to the edges of the extensions 4. Up to this point the hook fitting closely within the extended apertures 4 could not be moved therefrom into the mediate apertures 3; but when the notched portion of the hook comes into the extensions 4 then (the hook being at said notched portion of less thickness than the contracted throat 5 between the apertures and the extensions) the hook can be shifted from the extensions into the apertures, and this having been done the stem assumes a central position relatively to the ears. The edges of the ears now rest between the point 11 of the hook and the bend 8 of said hook from the stem, and the outward spring-pressure of said ears against said point and bend tends to retain the ears upon the stem at whatever angle of inclination to the axis of the band the stem may be placed. In order, however, to retain the stem in position with absolute certainty, there are formed on each ear adjacent to the semicircular periphery thereof outwardly-extending bosses 13 in series, the number in the series being determined by the distance between two adjacent bosses, which should be substantially the same as the thickness of the end of the hook. These bosses are formed in the stamping out of the band by indenting the sheet metal outward. This construction provides a number of positions to which the stem may be adjusted. In adjusting the stem from one position to the other the point of the hook and the bend thereof from the stem pass over bosses on opposite ears, causing said ears to spring inward to permit said passage thereover. This resilient resistance of said ears tends to keep the hook within or between the bosses between which it has been placed, so that the device may be said to be self-locking in any position of adjustment to which it has been moved.

In order to permit the band to fit different sizes of hose, it is formed with circumferential slits 14, which divide the central portion of the band into three strips 15, of which the central strip can be flattened or bent down, as shown in Fig. 5, and thus fit tightly against a hose of less diameter than would be clamped by the same band when all the strips are in their original circular form.

This device also forms convenient means for holding the hose in the hand, the stem forming a handle for that purpose. This is particularly advantageous when the hose leaks and the water runs along the same, so that a person taking hold of the hose itself would be wet by the water leading therefrom.

I claim—

1. In a garden-hose support, the combination of a band for surrounding the hose, having its ends bent substantially parallel with each other to form ears, and a stem having a head pivoted on said ears, the ears being indented to form bosses engaging said head to limit the movement of the stem, substantially as described.

2. In a garden-hose support, the combination of a band for surrounding the hose, having its ends bent substantially parallel with each other to form ears, and apertured, and a stem having a head integral therewith passed through said apertures, said band having means formed integrally therewith for securing the stem at any one of a series of positions of inclination to the band, substantially as described.

3. In a garden-hose support, the combination of a band for surrounding the hose, having its ends bent substantially parallel with each other to form ears, and apertured, and a stem bent at its upper end to form a hook passed through said apertures, the bend of the hook and the point thereof being engaged by said ears springing outward, substantially as described.

4. In a garden-hose support, the combination of a support for the hose, having apertured ears, and a stem the upper end of which is formed into a hook passed through said apertures, the bend and point of the hook being engaged by said ears to limit the angular movement of the clamp relatively to the stem, substantially as described.

5. In a garden-hose support, the combination of a support for the hose having apertured ears, and a stem having a head pivoted on said ears, the ears being indented to form bosses engaging said head to limit the movement of the stem, substantially as described.

6. In a garden-hose support, the combination of a support for the hose having apertured ears, a stem having its upper end formed into a hook passed through said apertures, the ears being indented to form bosses engaging said hook to limit the movement of the stem, substantially as described.

7. In a garden-hose support, the combination of a support for the hose having apertured ears, said apertures having lateral extensions and contracted throats between said apertures and extensions, and a stem having a hook contracted in thickness at a suitable point thereof to permit said contracted portion of the hook to pass through the contracted throat, whereby the stem can be moved from the extensions to the apertures, substantially as described.

8. In a garden-hose support, the combination of a support for the hose having apertured ears, said apertures having lateral extensions and contracted throats between said apertures and extensions, and a stem having a hook contracted in thickness at a suitable point thereof to permit said contracted portion of the hook to pass through the contracted throat, whereby the stem can be moved from the extensions to the apertures, the ears being indented to form bosses engaging said hook to limit the movement of the stem, substantially as described.

9. In a garden-hose support, the combination of a band having ears, and means for holding said ears together, said band having two circumferential slits on the opposite side to said means, said slits thus forming three strips, the middle strip being integrally connected at both of its ends with the band and being adapted to be bent inward to reduce the clamping diameter of the band, substantially as described.

10. In a garden-hose support, the combination of a piece of spring sheet metal bent to form ears or flaps and apertured, and a stem having a head formed integral therewith passed through said apertures, said piece having means formed integrally therewith for securing the stem at any one of a series of inclinations to the pieces, substantially as described.

In witness whereof I have hereunto set my hand in the presence of two subscribing witnesses.

JOSEPH McBOYLE.

Witnesses:
FRANCIS M. WRIGHT,
BESSIE GORFINKEL.